United States Patent
Voci

(10) Patent No.: US 11,208,580 B2
(45) Date of Patent: Dec. 28, 2021

(54) SINGLE-COMPONENT THERMOSETTING EPOXY RESIN HAVING HIGH SCOURING RESISTANCE

(71) Applicant: SIKA TECHNOLOGY AG, Baar (CH)

(72) Inventor: Antonio Voci, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 12 days.

(21) Appl. No.: 16/630,780

(22) PCT Filed: Jul. 9, 2018

(86) PCT No.: PCT/EP2018/068527
§ 371 (c)(1),
(2) Date: Jan. 13, 2020

(87) PCT Pub. No.: WO2019/011849
PCT Pub. Date: Jan. 17, 2019

(65) Prior Publication Data
US 2021/0147731 A1    May 20, 2021

(30) Foreign Application Priority Data

Jul. 13, 2017 (EP) .................................... 17181275

(51) Int. Cl.
*C09J 163/00* (2006.01)

(52) U.S. Cl.
CPC .................... *C09J 163/00* (2013.01)

(58) Field of Classification Search
CPC .................................................. C09J 163/00
USPC ....................................................... 523/218
See application file for complete search history.

(56) References Cited

U.S. PATENT DOCUMENTS

2009/0264558 A1* 10/2009 Kramer ................ C09J 163/00
523/400

FOREIGN PATENT DOCUMENTS

| CN | 106520077 A | * | 3/2017 | ............... C09K 5/06 |
| EP | 1 174 481 A2 | | 1/2002 | |
| GB | 1 124 251 A | | 8/1968 | |
| WO | 94/26406 A1 | | 11/1994 | |
| WO | 2008/077918 A1 | | 7/2008 | |
| WO | 2008/115812 A2 | | 9/2008 | |
| WO | 2016/108958 A1 | | 7/2016 | |

OTHER PUBLICATIONS

Cui et al., CN 106520077 A Translation in English, Mar. 22, 2017 (Year: 2017).*
Jan. 14, 2020 International Preliminary Report on Patentability issued in International Patent Application No. PCT/EP2018/068527.
Jul. 27, 2018 International Search Report issued in International Patent Application No. PCT/EP2018/068527.

* cited by examiner

*Primary Examiner* — David T Karst
(74) *Attorney, Agent, or Firm* — Oliff PLC

(57) ABSTRACT

A single-component thermosetting epoxy resin adhesives, including: a) at least one epoxy resin having, on average, more than one epoxy group per molecule; b) at least one latent hardener for epoxy resins; and c) 2-7 wt % aerogel particles, relative to the total weight of the single-component thermosetting epoxy resin adhesive, wherein the epoxy resin adhesive has a viscosity of 1000-4000 Pas, in particular 1000-3500 Pas, at 25° C., wherein the viscosity is oscillographically determined by means of a rheometer having a heatable plate (MCR 301, AntonPaar) (gap 1000 μm, measurement plate diameter: 25 mm (plate/plate), deformation 0.01 at 5 Hz, temperature: 25° C.). The epoxy resin adhesives are characterized in that they can be easily applied in the temperature range from 40° C. to 70° C. and are scouring-resistant, even at higher temperatures.

12 Claims, No Drawings

SINGLE-COMPONENT THERMOSETTING EPOXY RESIN HAVING HIGH SCOURING RESISTANCE

TECHNICAL FIELD

The invention relates to the field of thermosetting epoxy adhesives.

PRIOR ART

One-component thermosetting epoxy resin adhesives have already long been used in the as adhesives for the bodyshell construction of modes of transport. After the application of these adhesives and the joining, the joined parts are painted. In order to optimize the painting process, these parts are cleaned by means of wash liquid prior to the painting. In order to withstand this cleaning process and not to lead to impurities and contaminations in the subsequent cathodic electrocoating process, the adhesive used must have maximum "washout resistance".

The adhesives of this kind to date are of very high viscosity on application at room temperature and are therefore applied predominantly at higher temperatures. However, this is a great disadvantage particularly when the application is to be effected as a spray application.

SUMMARY OF THE INVENTION

It is therefore an object of the present invention to provide thermosetting epoxy resin compositions having good applicability within the temperature range from 40° C. to 70° C., especially 30° C. to 70° C., and having washout resistance even at higher temperatures, i.e. between 20 and 100° C., especially between 40 and 70° C., preferably between 50 and 70° C.

It has been found that, surprisingly, a one-component thermosetting epoxy resin composition as claimed in claim 1 was capable of achieving this object.

It has further been found that, surprisingly, such inventive epoxy resin compositions that additionally comprise impact modifiers have high impact peel strength at room temperature and low temperatures.

Further aspects of the invention are the subject of further independent claims, and further preferred embodiments of the invention are the subject of the dependent claims.

WAYS OF EXECUTING THE INVENTION

The present invention thus relates to a one-component thermosetting epoxy resin adhesive comprising a) at least one epoxy resin having an average of more than one epoxy group per molecule;
b) at least one latent curing agent for epoxy resins; and
c) 2-7% by weight, especially 2-6.5% by weight, 2-5% by weight, 2-4% by weight, of aerogel particles, based on the total weight of the one-component thermosetting epoxy resin adhesive, wherein the epoxy resin adhesive has a viscosity of 1000-4000 Pas, especially 1000-3500 Pas, at 25° C., determining the viscosity by oscillography by means of a rheometer with a heatable plate (MCR 301, Anton Paar) (1000 μm gap, measurement plate diameter: 25 mm (plate/plate), deformation 0.01 at 5 Hz, temperature: 25° C.).

The epoxy resin adhesive has one component, meaning that the constituents of the epoxy resin adhesive, especially the epoxy resin and the curing agent, are present in one component without occurrence of curing at standard ambient temperature or room temperature. Therefore, the one-component epoxy resin adhesive is storage-stable. It is therefore salable in this form, whereas, in the case of two-component systems, the mixing of the components is possible only immediately before application.

The one-component epoxy resin adhesive is cured by heating, typically at a temperature exceeding 70° C., for example in the range from 100 to 220° C. In this respect, it is a one-component thermosetting epoxy resin adhesive.

The prefix "poly" in expressions such as polyol or polyisocyanate means that the compound has two or more of the groups mentioned. For example, a polyisocyanate is a compound having two or more isocyanate groups.

The expression "independently" as used hereinafter means that multiple substituents having the same designation in the same molecule may have the same or different meaning according to the definition.

In this formulae of this document, the dotted lines in the formulae each represent the bond between the respective substituent and the corresponding molecule residue.

Room temperature is understood here to mean a temperature of 23° C., unless stated otherwise.

The thermosetting one-component epoxy resin adhesive contains at least one epoxy resin having an average of more than one epoxy group molecule. The epoxy group is present preferably as glycidyl ether group. The epoxy resin having an average of more than one epoxy group per molecule is preferably a liquid epoxy resin or a solid epoxy resin. The term "solid epoxy resin" is very well known to a person skilled in the art of epoxies and is used in contrast to "liquid epoxy resins". The glass transition temperature of solid resins is above room temperature, meaning that they can be comminuted at room temperature to give free-flowing powders.

Preferred solid epoxy resins have the formula (X)

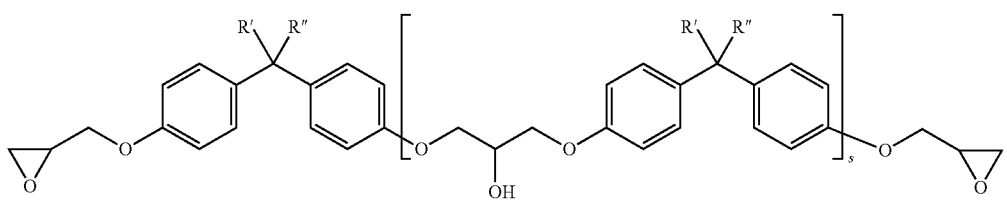

(X)

The substituents R' and R" here are independently either H or $CH_3$.

In addition, the index s has a value of >1.5, especially of 1.5 to 12, preferably 2 to 12.

Such solid epoxy resins are commercially available, for example from Dow or Huntsman or Momentive.

Compounds of the formula (X) having an index s in the range from greater than 1 to 1.5 are referred to by the person skilled in the art as semisolid epoxy resins. For the present invention here, they are likewise considered to be solid resins. However, preference is given to solid epoxy resins in the narrower sense, i.e. solid epoxy resins of the formula (X) with an index s having a value of >1.5.

Preferred liquid epoxy resins have the formula (XI)

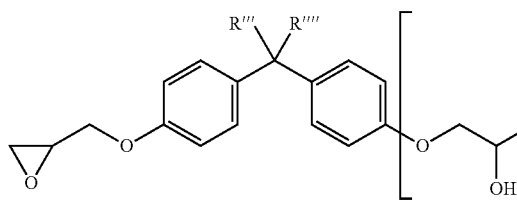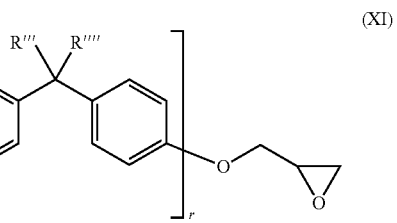

(XI)

The substituents R''' and R'''' here are independently either H or $CH_3$. In addition, the index r has a value of 0 to 1. Preferably, r has a value of 0 to less than 0.2.

Preference is thus given to diglycidyl ethers of bisphenol A (BADGE), of bisphenol F and of bisphenol A/F (the designation 'A/F' refers here to a mixture of acetone with formaldehyde, which is used as reactant in its preparation). Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Momentive).

Preferably, the epoxy resin is a liquid epoxy resin of the formula (XI). In a still more preferred embodiment, the thermosetting epoxy resin adhesive contains both at least one liquid epoxy resin of the formula (XI) and at least one solid epoxy resin of the formula (X).

The proportion of the epoxy resin having an average of more than one epoxy group per molecule is preferably 10% to 85% by weight, especially 15% to 70% by weight and more preferably 15% to 60% by weight, based on the total weight of the epoxy resin adhesive.

The thermosetting one-component epoxy resin adhesive also contains at least one latent curing agent for epoxy resins. Latent curing agents are substantially inert at room temperature and are activated by elevated temperature, typically at temperatures of 70° C. or more, which starts the curing reaction. It is possible to use the standard latent curing agents for epoxy resins. Preference is given to a latent nitrogen-containing curing agent for epoxy resins.

Examples of suitable latent curing agents are dicyandiamide, guanamines, guanidines, aminoguanidines and their derivatives; substituted ureas, especially 3-(3-chloro-4-methylphenyl)-1,1-dimethylurea (chlorotoluron), or phenyldimethylureas, especially p-chlorophenyl-N,N-dimethylurea (monuron), 3-phenyl-1,1-dimethylurea (fenuron) or 3,4-dichlorophenyl-N,N-dimethylurea (diuron), and also imidazoles and amine complexes.

The curing agent is preferably selected from the list consisting of dicyandiamide, guanamines, guanidines, aminoguanidines and derivatives thereof, substituted ureas, imidazoles and amine complexes.

A particularly preferred latent curing agent is dicyandiamide.

The proportion of the latent curing agent is preferably 0.5% to 12% by weight, more preferably 1% to 8% by weight, based on the total weight of the epoxy resin adhesive.

The thermosetting epoxy resin adhesive also contains 2-7% by weight, especially 2-6.5% by weight, 2-5% by weight, preferably 2-4% by weight, of aerogel particles, based on the total weight of the one-component thermosetting epoxy resin adhesive.

If the proportion is 2-5% by weight, preferably 2-4% by weight, especially 3-4% by weight, of aerogel particles, based on the total weight of the one-component thermosetting epoxy resin adhesive, this is conducive to high impact peel strength values, especially in the range from 23° C. to −30° C.

The term "aerogel" in the present document is preferably understood to mean a highly porous material composed of silicon oxides or metal oxides having low density which is produced by forming a gel and then removing liquid from the gel, while the gel structure is essentially retained.

Preferred aerogel particles of the invention have a BET surface area of more than 200 $m^2/g$, more than 300 $m^2/g$, more than 400 $m^2/g$. Particular preference is given to aerogel particles having a surface area of 500-1000 $m^2/g$, especially 600-800 $m^2/g$. Preferably, under the term "BET surface area" a BET surface area which is measured to DIN ISO 9277.

Preferably, the particle density of the aerogel particles is 90-200 $kg/m^3$, especially 110-190 $kg/m^3$. Preferably, the term "particle density" is understood to mean a bulk density which is measured to DIN ISO 697.

Also preferred are aerogel particles having pore sizes of less than 180 nm, especially less than 150 nm, less than 100 nm, more preferably less than 50 nm.

Preference is given to aerogel particles based on silicon dioxide ($SiO_2$). However, it is also possible to use aerogel particles based on metal oxides, for example aluminum oxide ($Al_2O_3$).

Particular preference is given to aerogel particles based on synthetic amorphous silica gel that may optionally have been surface-modified.

Preference is given to using amorphous silicon dioxide aerogel particles that have been surface-modified with trimethylsilyl groups. Such amorphous silicon dioxide-based aerogel particles differ from other silicon dioxide materials such as crystalline silicon dioxide or other forms of amorphous silicon dioxide such as fumed silicon dioxide.

Preference is given to aerogel particles having an average particle size of 0.01-5 mm, preferably 0.1-4 mm, especially preferably 1-4 mm.

The term "median particle size" relates here preferably to the D50 of the cumulative volume distribution curve at which 50% by volume of the particles have a diameter smaller than the value. The average particle size or the D50 is preferably determined by laser diffractometry.

The person skilled in the art knows how aerogel particles are produced. Specific methods of producing aerogel particles are elucidated, for example, in WO 2008/115812 A2 (Cabot) or EP 0699104 B1 (Hoechst). Aerogel particles are commercially available from various sources. Suitable aerogel particles are, for example, those available from Cabot Corp. (Billerica, Mass., USA) under the trade names of Aerogel particles P100, 200 and 300.

The thermosetting epoxy resin adhesive optionally comprises at least one toughness improver D. The toughness improvers D may be liquid or solid.

More particularly, the toughness improver D is selected from the group consisting of terminally blocked polyurethane polymers D1, liquid rubbers D2 and core-shell polymers D3.

The toughness improver D is preferably a terminally blocked polyurethane polymer D1, preferably a terminally blocked polyurethane prepolymer of the formula (I)

$$R^1 \!-\!\!\left[\begin{array}{c}H\\N\\\phantom{x}\\\phantom{x}\end{array}\!\!\!\!\!\begin{array}{c}\\\\O\end{array}\!\!\!\!R^2\right]_p \quad (I)$$

$R^1$ here is a p-valent radical of a linear or branched polyurethane prepolymer terminated by isocyanate groups after the removal of the terminal isocyanate groups, and p has a value of 2 to 8.

In addition, $R^2$ is independently a substituent selected from the group consisting of

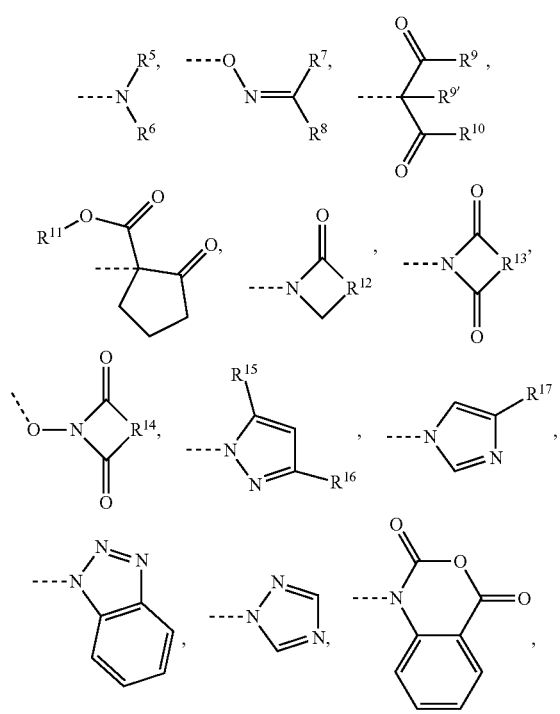

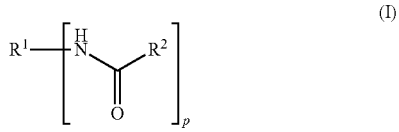

$R^5$, $R^6$, $R^7$ and $R^8$ here are each independently an alkyl or cycloalkyl or aralkyl or arylalkyl group, or $R^5$ together with $R^6$, or $R^7$ together with $R^8$, form part of a 4- to 7-membered, optionally substituted ring.

In addition, $R^{9'}$ and $R^{10}$ are each independently an alkyl or aralkyl or arylalkyl group or an alkyloxy or aryloxy or aralkyloxy group, and $R^{11}$ is an alkyl group.

$R^{12}$, $R^{13}$ and $R^{14}$ are each independently an alkylene group which has 2 to 5 carbon atoms and optionally has double bonds or is substituted, or a phenylene group or a hydrogenated phenylene group.

$R^{15}$, $R^{16}$ and $R^{17}$ are each independently H or an alkyl group or an aryl group or an aralkyl group, and $R^{18}$ is an aralkyl group or a mono- or polycyclic, substituted or unsubstituted aromatic group that optionally has aromatic hydroxyl groups.

Finally, $R^4$ is a radical of an aliphatic, cycloaliphatic, aromatic or araliphatic epoxide containing a primary or secondary hydroxyl group after the removal of the hydroxyl and epoxy groups, and m has a value of 1, 2 or 3.

$R^{18}$ is especially considered to be firstly phenols or polyphenols, especially bisphenols, after removal of a hydroxyl group. Preferred examples of such phenols and bisphenols are especially phenol, cresol, resorcinol, catechol, cardanol (3-pentadecenylphenol (from cashewnut-shell oil)), nonylphenol, phenols that have been reacted with styrene or dicyclopentadiene, bisphenol A, bisphenol F and 2,2'-diallylbisphenol A. $R^{18}$ is secondly considered to be especially hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, it is especially a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is especially a methylene-bonded aromatic group, especially a benzyl group.

If $R^5$, $R^6$, $R^7$, $R^8$, $R^9$, $R^{9'}$ or $R^{10}$ is an alkylaryl group, this is especially a phenylene-bonded $C_1$- to $C_{20}$-alkyl group, for example tolyl or xylyl.

The $R^2$ radicals are preferably the substituents of the formulae $$\text{-----N}\!\!\begin{array}{c}\\\phantom{x}\end{array}\!\!\!R^{12}, \quad \text{-----O---}R^{18} \quad \text{and} \quad \text{-----O}\!\!\begin{array}{c}\\R^4\end{array}\!\!\!\left[\!\!\begin{array}{c}O\\\triangledown\end{array}\!\!\right]_m.$$

A preferred substituent of the formula $$\text{-----N}\!\!\begin{array}{c}O\\\phantom{x}\\\phantom{x}\end{array}\!\!\!R^{12}$$

is ε-caprolactam after removal of the NH proton.

Preferred substituents of the formula —O—R$^{18}$ are monophenols or polyphenols, especially bisphenols, after removal of a phenolic hydrogen atom. Particularly preferred examples of such R$^2$ radicals are radicals selected from the group consisting of

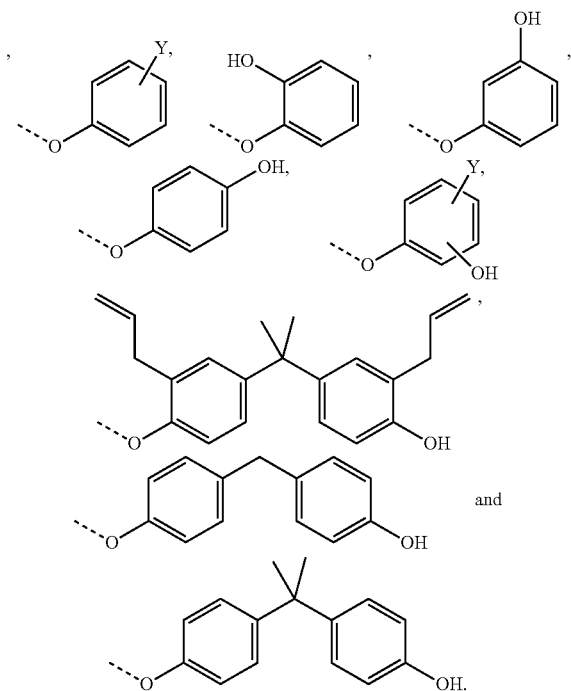

The Y radical here is a saturated, aromatic or olefinically unsaturated hydrocarbyl radical having 1 to 20 carbon atoms, especially having 1 to 15 carbon atoms. Preferred Y are especially allyl, methyl, nonyl, dodecyl, phenyl, alkyl ether, carboxylic ester or an unsaturated C$_{15}$-alkyl radical having 1 to 3 double bonds.

Most preferably, R$^2$ is —O—R$^{18}$.

The terminally blocked polyurethane prepolymer of the formula (I) is prepared from the linear or branched polyurethane prepolymer terminated by isocyanate groups with one or more isocyanate-reactive compounds R$^2$H. If two or more such isocyanate-reactive compounds are used, the reaction can be effected sequentially or with a mixture of these compounds.

The reaction is preferably effected in such a way that the one or more isocyanate-reactive compounds R$^2$H are used stoichiometrically or in a stoichiometric excess in order to ensure that all NCO groups have been converted.

The polyurethane prepolymer with isocyanate end groups on which R' is based can be prepared from at least one diisocyanate or triisocyanate and from a polymer Q$_{PM}$ having terminal amino, thiol or hydroxyl groups and/or from an optionally substituted polyphenol Q$_{PP}$.

Suitable diisocyanates are aliphatic, cycloaliphatic, aromatic or araliphatic diisocyanates, especially commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate (H$_{12}$MDI), p-phenylene diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the previous paragraph. It is of course also possible to use suitable mixtures of di- or triisocyanates.

Especially suitable polymers Q$_{PM}$ having terminal amino, thiol or hydroxyl groups are polymers Q$_{PM}$ having two or three terminal amino, thiol or hydroxyl groups.

The polymers Q$_{PM}$ advantageously have an equivalent weight of 300-6000, especially of 600-4000, preferably of 700-2200, g/equivalent of NCO-reactive groups.

Suitable polymers Q$_{PM}$ are polyols, for example the following commercially available polyols or any mixtures thereof:

polyoxyalkylene polyols, also called polyether polyols, which are the polymerization product of ethylene oxide, 1,2-propylene oxide, 1,2- or 2,3-butylene oxide, tetrahydrofuran or mixtures thereof, optionally polymerized with the aid of a starter molecule having two or three active hydrogen atoms, for example water or compounds having two or three OH groups. It is possible to use either polyoxyalkylene polyols having a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts for short), or polyoxyalkylene polyols having a higher degree of unsaturation, prepared, for example, with the aid of anionic catalysts such as NaOH, KOH or alkali metal alkoxides. Particularly suitable are polyoxypropylenediols and -triols having a degree of unsaturation of less than 0.02 meq/g and having an average molecular weight in the range of 1000-30 000 daltons, polyoxybutylenediols and -triols, polyoxypropylenediols and -triols having an average molecular weight of 400-8000 daltons, and what are called "EO-endcapped" (ethylene oxide-endcapped) polyoxypropylenediols or -triols. The latter are specific polyoxypropylene polyoxyethylene polyols that are obtained, for example, when pure polyoxypropylene polyols, on completion of the polypropoxylation reaction, are alkoxylated with ethylene oxide and hence have primary hydroxyl groups.

hydroxy-terminated polybutadiene polyols, for example those that are prepared by polymerization of 1,3-butadiene and allyl alcohol or by oxidation of polybutadiene, and hydrogenation products thereof;

styrene-acrylonitrile-grafted polyether polyols as supplied, for example, by BASF under the Lupranol® name;

polyhydroxy-terminated acrylonitrile/butadiene copolymers as preparable, for example, from carboxyl-terminated acrylonitrile/butadiene copolymers (commercially available under the Hypox® CTBN name from Emerald Performance Materials) and epoxides or amino alcohols;

polyester polyols prepared, for example, from di- to trivalent alcohols, for example ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the aforementioned alcohols with organic dicarboxylic acids or the anhydrides or esters thereof, for example succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and polyester polyols formed from lactones, for example ε-caprolactone;

polycarbonate polyols as obtainable by reaction, for example, of the abovementioned alcohols—used to form the polyester polyols—with dialkyl carbonates, diaryl carbonates or phosgene.

Advantageously, the polymers $Q_{PM}$ are difunctional or higher-functionality polyols having OH equivalent weights of 300 to 6000 g/OH equivalent, especially of 600 to 4000 g/OH equivalent, preferably 700-2200 g/OH equivalent. Further advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, hydrogenation products thereof and mixtures of these polyols mentioned.

In addition, polymers $Q_{PM}$ used may also be difunctional or higher-functionality amino-terminated polyethylene ethers, polypropylene ethers, as sold, for example, under the Jeffamine® name by Huntsman, polybutylene ethers, polybutadienes, butadiene/acrylonitrile copolymers, as sold, for example, under the Hypro® ATBN name by Emerald Performance Materials, and further amino-terminated synthetic rubbers or mixtures of the components mentioned.

For certain applications, suitable polymers $Q_{PM}$ are especially polybutadienes or polyisoprenes having hydroxyl groups or the partially or fully hydrogenated reaction products thereof.

It is additionally possible that the polymers $Q_{PM}$ may also have been chain-extended in the manner known to the person skilled in the art by the reaction of polyamines, polyols and polyisocyanates, especially diamines, diols and diisocyanates.

Using the example of a diisocyanate and a diol, what is formed therefrom, as shown hereinafter, according to the stoichiometry chosen, is a species of the formula (VI) or (VII)

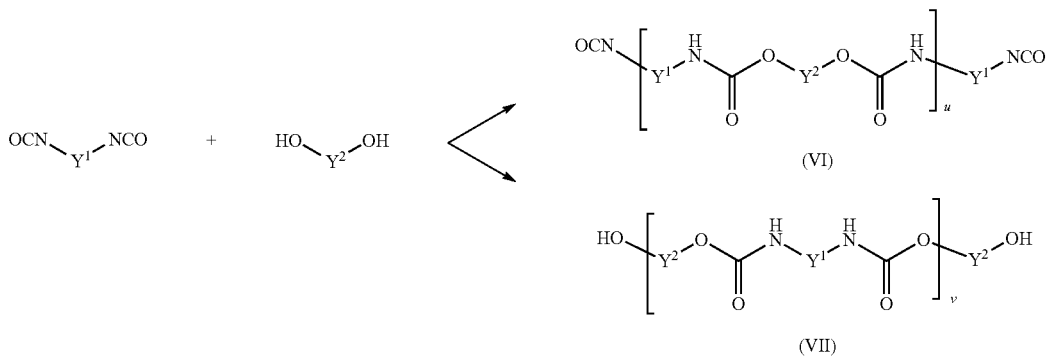

The $Y^1$ and $Y^2$ radicals are a divalent organic radical and the indices u and v vary according to the stoichiometric ratio from 1 to typically 5.

These species of the formula (VI) or (VII) may then in turn be reacted further. For example, the species of the formula (VI) and a diol having a divalent organic radical $Y^3$ can be used to form a chain-extended polyurethane prepolymer of the following formula:

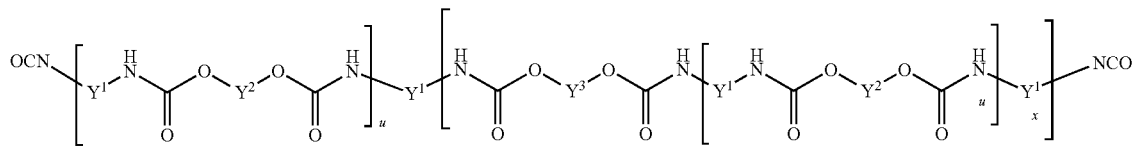

The species of the formula (VII) and a diisocyanate having a divalent organic radical $Y^4$ can be used to form a chain-extended polyurethane prepolymer of the following formula:

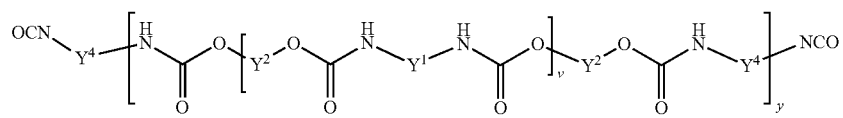

According to the stoichiometric ratio, the indices x and y vary from 1 to typically 5, and are especially 1 or 2.

In addition, it is also possible to react the species of the formula (VI) with the species of the formula (VII), so as to form a chain-extended polyurethane prepolymer having NCO groups.

For the chain extension, preference is given especially to diols and/or diamines and diisocyanates. It will of course be clear to the person skilled in the art that higher-functionality polyols, for example trimethylolpropane or pentaerythritol, or higher-functionality polyisocyanates, such as isocyanurates of diisocyanates, can also be used for the chain extension.

In the case of the polyurethane prepolymers in general and in the specific case of the chain-extended polyurethane prepolymers, it should advantageously be ensured that the prepolymers do not have excessively high viscosities, especially when higher-functionality compounds are being used for the chain extension, since this can make it difficult to convert them to the polyurethane prepolymers of the formula (I) or to apply the adhesive.

Preferred polymers $Q_{PM}$ are polyols having average molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxy polyalkylene glycols having $C_2$-$C_6$-alkylene groups or having mixed $C_2$-$C_6$-alkylene groups, terminated by amino, thiol or, preferably, hydroxyl groups. Particular preference is given to polypropylene glycols or polybutylene glycols. Particular preference is further given to hydroxyl group-terminated polyoxybutylenes.

Especially suitable polyphenols $Q_{PP}$ are bis-, tris- and tetraphenols. This is understood to mean not just straight phenols but optionally also substituted phenols. The nature of the substitution may be very varied. More particularly, this is understood to mean substitution directly on the aromatic ring to which the phenolic OH group is bonded. Phenols are additionally understood to mean not just monocyclic aromatics but also polycyclic or fused aromatics or heteroaromatics that have the phenolic OH group directly on the aromatic or heteroaromatic system.

The nature and position of such a substituent affects the reaction with isocyanates necessary for the formation of the polyurethane prepolymer among other properties.

The bis- and trisphenols are particularly suitable. Examples of suitable bisphenols or trisphenols include 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'-diallylbisphenol-A, diphenols and dicresols prepared by reaction of phenols or cresols with diisopropylidenebenzene, phloroglucinol, gallic esters, phenol or cresol novolaks having —OH functionality of 2.0 to 3.5, and all isomers of the aforementioned compounds.

In a first embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethane, especially by using the diisocyanate or triisocyanate in a stoichiometric excess in relation to the amino, thiol or hydroxyl groups of the polymer $Q_{PM}$.

In a second embodiment, the polyurethane prepolymer is prepared from at least one diisocyanate or triisocyanate and from an optionally substituted polyphenol $Q_{PP}$. The polyurethane prepolymer is prepared in a manner known to the person skilled in the art of polyurethane, especially by using the diisocyanate or triisocyanate in a stoichiometric excess in relation to the phenolic groups of the polyphenol $Q_{PP}$.

In a third embodiment, the polyurethane prepolymer is prepared from at least one diisocyanate or triisocyanate and from a polymer $Q_{PM}$ having terminal amino, thiol or hydroxyl groups and from an optionally substituted polyphenol $Q_{PP}$. There are different options available for preparation of the polyurethane prepolymer from at least one diisocyanate or triisocyanate and from a polymer $Q_{PM}$ having terminal amino, thiol or hydroxyl groups and/or from an optionally substituted polyphenol $Q_{PP}$.

Particular preference is given to the first embodiment.

The polyurethane polymer having isocyanate end groups preferably has elastic character. It preferably exhibits a glass transition temperature Tg of less than 0° C.

Preferably, the proportions of the following are:

toughness improver D1 10-60% by weight, especially 20-40% by weight;

toughness improver D2 10-30% by weight, especially 20-30% by weight;

toughness improver D3 10-30% by weight, especially 20-30% by weight;

based on the total weight of the epoxy resin adhesive.

In a preferred embodiment, the one-component thermosetting epoxy resin adhesive additionally comprises at least one filler F. Preference is given here to mica, talc, kaolin, wollastonite, feldspar, syenite, chlorite, bentonite, montmorillonite, calcium carbonate (precipitated or ground), dolomite, quartz, cristobalite, calcium oxide, aluminum hydroxide, magnesium oxide, hollow ceramic beads, hollow glass beads, hollow organic beads, glass beads, color pigments. Particular preference is given to fillers selected from the group consisting of calcium carbonate and calcium oxide.

Advantageously, the total proportion of the overall filler F is 5-40% by weight, preferably 5-20% by weight, based on the total weight of the epoxy resin adhesive.

It may also be advantageous when the proportion of silicas (fumed or precipitated), based on the total weight of the epoxy resin adhesive, is less than 5% by weight, less than 2% by weight, less than 1% by weight, less than 0.5% by weight, especially less than 0.1% by weight. More preferably, the epoxy resin adhesive is free of silicas (fumed or precipitated).

The one-component thermosetting epoxy resin adhesive may further additionally comprise at least one epoxy group-bearing reactive diluent G. Such reactive diluents are known to those skilled in the art. Preferred examples of epoxy-bearing reactive diluents are:

glycidyl ethers of monofunctional, saturated or unsaturated, branched or unbranched, cyclic or open-chain, $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, and the like;

glycidyl ethers of difunctional, saturated or unsaturated, branched or unbranched, cyclic or open-chain, $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, and the like;

glycidyl ethers of tri- or polyfunctional, saturated or unsaturated, branched or unbranched, cyclic or open-chain, alcohols, such as epoxidized castor oil, epoxidized trimethylolpropane, epoxidized pentaerythritol or polyglycidyl ethers of aliphatic polyols, such as sorbitol, glycerol, trimethylolpropane, and the like;

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashewnutshell oil), N,N-diglycidylaniline, and the like;

epoxidized amines, such as N,N-diglycidylcyclohexylamine, and the like;

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, and the like;

epoxidized di- or trifunctional, low to high molecular weight polyether polyols, such as polyethylene glycol diglycidyl ether, polypropylene glycol diglycidyl ether, and the like.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the epoxy-bearing reactive diluent G is 0.1-15% by weight, preferably 0.1-5% by weight, especially preferably 0.1-2% by weight, more preferably 0.2-1% by weight, based on the total weight of the epoxy resin adhesive.

The one-component thermosetting epoxy resin adhesive may include further constituents, especially catalysts, stabilizers, especially heat and/or light stabilizers, thixotropic agents, plasticizers, solvents, mineral or organic fillers, blowing agents, dyes and pigments, anticorrosives, surfactants, defoamers and adhesion promoters.

A particularly preferred thermosetting one-component epoxy resin adhesive comprises:

10-60% by weight, especially 30-50% by weight, based on the total weight of the epoxy resin composition, of epoxy resin having an average of more than one epoxy group per molecule; preferably 50-100% by weight, especially 80-100% by weight, of the epoxy resin is a liquid epoxy resin and 0-30% by weight, especially 0-20% by weight, more preferably 5-15% by weight, of the epoxy resin is a solid epoxy resin;

1-10% by weight, especially 2-6% by weight, based on the total weight of the epoxy resin composition, of at least one latent curing agent for epoxy resins;

2-7% by weight, especially 2-6.5% by weight, 2-5% by weight, 2-4% by weight, of aerogel particles, based on the total weight of the one-component thermosetting epoxy resin adhesive;

at least one toughness improver D selected from the group consisting of terminally blocked polyurethane polymers D1, liquid rubbers D2 and core-shell polymers D3, where the proportions are preferably as follows:

toughness improver D1 10-60% by weight, especially 20-40% by weight;

toughness improver D2 10-30% by weight, especially 20-30% by weight;

toughness improver D3 10-30% by weight, especially 20-30% by weight;

based on the total weight of the epoxy resin composition;

preferably 5-40% by weight, preferably 5-20% by weight, based on the total weight of the epoxy resin composition, of a filler F selected from the group consisting of calcium carbonate and calcium oxide;

preferably 0.1-15% by weight, preferably 0.1-5% by weight, especially preferably 0.1-2% by weight, more preferably 0.2-1% by weight, based on the total weight of the epoxy resin composition, of an epoxy-bearing reactive diluent G.

It may further be advantageous when the preferred one-component thermosetting epoxy resin adhesive consists of the aforementioned constituents to an extent of more than 80% by weight, preferably more than 90% by weight, especially more than 95% by weight, especially preferably more than 98% by weight, most preferably more than 99% by weight, based on the total weight of the epoxy resin composition.

The one-component thermosetting epoxy resin adhesive has a viscosity of 1000 Pas-4000 Pas at 25° C., especially 1000 Pas-3500 Pas at 25° C. More preferably, the viscosity at 25° C. has a value between 1000 Pas and 3000 Pas. Most preferably, the viscosity at 25° C. is between 1100 Pas and 2800 Pas.

The viscosity is measured here by oscillography by means of a rheometer having a heatable plate (MCR 301, Anton-Paar) (1000 μm gap, measurement plate diameter: 25 mm (plate/plate), deformation 0.01 at 5 Hz, temperature: 25° C.). At 60° C., the adhesive advantageously has a viscosity (measured correspondingly at 60° C.) between 600 Pas and 50 Pas. At 50° C., the adhesive advantageously has a viscosity (measured correspondingly at 50° C.) between 800 Pas and 150 Pas.

A further aspect of the present invention relates to a method of bonding substrates, especially metal substrates, comprising the steps of a) applying a one-component thermosetting epoxy resin adhesive of the invention as defined above to a first substrate, especially metal substrate;

b) contacting the epoxy resin adhesive applied with a second substrate, especially metal substrate, to form an adhesive bond; and c) curing the epoxy resin adhesive in the adhesive bond at a temperature in the range from 100 to 220° C.

The first and/or second substrate, especially metal substrate, may each be used as such or as part of an article, i.e. of an article comprising the first or second substrate, especially metal substrate. Preference is given to using the substrates, especially metal substrates, as such. The first substrate and the second substrate, especially metal substrate, may be made of the same material or a different material.

The first substrate and/or second substrate are preferably metal substrates. However, as the case may be, heat-resistant plastics, for example polyamides (PA), polyphenylene ethers, e.g. Noryl®, or carbon fiber-reinforced plastics (CFP) are also conceivable as the first and/or second substrate.

All metal substrates known to the person skilled in the art are suitable in principle as the first and/or second metal substrate, especially in the form of a metal sheet as utilized, for example, in the construction of modes of transport, for example in the automotive industry, or in the manufacture of white goods.

Examples of the first and/or second metal substrate are metal substrates, especially metal sheets, made of steel, especially electrolytically galvanized steel, hot dip galvanized steel or oiled steel, Bonazinc-coated steel, and subsequently phosphated steel, and also aluminum, especially in the variants that typically occur in automaking, and also magnesium or magnesium alloys.

However, the first and/or second metal substrate are more preferably a metal substrate, especially a metal sheet, selected from steel with a zinc-magnesium coating, hot dip-galvanized steel having a coating comprising zinc sulfate and/or zinc hydroxysulfate, cold-rolled steel, aluminum, aluminum alloy or a metal, especially steel, with a coating of aluminum or an aluminum alloy, metal substrates, especially steel substrates, having a forming aid as coating, and magnesium or magnesium alloys.

The one-component thermosetting epoxy resin adhesive is applied to the first substrate, especially metal substrate, in step (a) of the method of the invention. This is effected, for example, at an application temperature of the adhesive of 10° C. to 80° C., preferably of 15° C. to 60° C., more preferably of 30 to 60° C. The application is preferably effected in the form of an adhesive bead. Automatic application is preferred.

The adhesive can be applied to the whole surface or to part of the surface of the first substrate, especially metal substrate. In a typical application, the adhesive can be applied, for example, solely in an edge region of the substrate, especially metal substrate.

In a further step b), the epoxy resin adhesive applied to the first substrate, especially metal substrate, is contacted with the second substrate, especially metal substrate, in order to form an adhesive bond.

The epoxy resin adhesive in the adhesive bond is cured by heating the adhesive to a temperature in the range from 100 to 220° C., preferably 120 to 200° C. The heating can be effected, for example, by infrared radiation or induction heating or in an oven, for example a cathodic electrocoating oven. In this way, the adhesive bond with the cured epoxy resin adhesive is obtained.

Preferably, a step b') is executed between step b) and step c), wherein step b') comprises: contacting the substrates and the one-component thermosetting epoxy resin adhesive in contact therewith with a wash liquid at a temperature between 20 and 100° C., especially between 40 and 70° C., preferably between 50 and 70° C.

Step b') is typically effected by spraying by means of a wash liquid or by dipping into a wash bath. This wash process is typically effected at a temperature of between 40 and 70° C.; preferably between 50 and 70° C. The wash liquid used is especially water. In addition, the wash liquid may contain further constituents, especially surfactants and or solvents. In the spraying are conducted many times with quite high pressure. Pressures of up to 4 bar are entirely customary.

The epoxy resin adhesive in the adhesive bond can be cured in one step, but curing in two or more steps is also possible, in which case operations, for example a wash and/or a dip coating operation, for example a cathodic electrocoating operation, of one or both substrates, especially metal substrates, with a subsequent wash may additionally be included between or during the curing steps.

The epoxy resin composition in the adhesive bond can be heated, for example, in a first step to a temperature of 100 to 130° C., preferably of 115 to 125° C., and in a second step to a temperature of 140-220° C., especially of 140-200° C. preferably between 160-190° C.

Between the two steps, further operations may be effected, for example contacted with a wash liquid, for example at a temperature of 20 to 100° C., preferably 40 and 70° C., and/or a dip coating operation on one or both substrates, especially metal substrates, in a cathodic electrocoating bath, in which case the curing of the epoxy resin adhesive in the second step can be performed, for example, simultaneously with the curing of the dip coating applied.

The one-component thermosetting epoxy resin adhesive of the invention and the method of the invention are especially suitable for bonding of substrates, especially metal substrates, for the production of modes of transport, especially automobiles, buses, trucks, rail vehicles, ships or aircraft, or white goods, especially washing machines, tumble driers or dishwashers, or parts thereof, preferably vehicles or installable parts thereof.

A further aspect of the invention relates to an article comprising a cured adhesive bond, wherein the adhesive bond is obtainable by the method of the invention described above.

The article may, for example, be a mode of transport, especially an automobile, bus, truck, rail vehicle, ship or aircraft, or a white good, especially a washing machine, a tumble drier or a dishwasher, or be part of such an article. The article is preferably a motor vehicle or an installable part of a motor vehicle.

A further aspect of the invention relates to the use of the one-component thermosetting epoxy resin adhesive of the invention as described above for heat-resistant bonding of substrates, especially metal substrates, especially metal substrates made of steel with a zinc-magnesium coating, hot dip-galvanized steel with a coating comprising zinc sulfate and/or zinc hydroxysulfate, cold-rolled steel, aluminum, aluminum alloy or a metal, especially steel, with a coating of aluminum or an aluminum alloy.

A further aspect of the invention relates to the use of aerogel particles as described above for increasing the washout resistance of a one-component thermosetting epoxy resin adhesive, especially a thermosetting epoxy resin adhesive in motor vehicle construction.

A further aspect of the invention relates to the use of aerogel particles as described above for increasing the impact peel (I-peel) strength (to ISO 11343), especially between 23° C. and −30° C., of a one-component thermosetting epoxy resin adhesive, especially a thermosetting epoxy resin adhesive in motor vehicle construction.

The invention is further elucidated hereinafter by examples, but these are not intended to restrict the invention in any way.

EXAMPLES

Production of the Compositions

According to the details in tables 1 and 2, the reference compositions Ref. 1-Ref. 6 and the inventive compositions Ex. 1 and Ex. 2 were produced. The stated amounts in tables 1 and 2 are stated in parts by weight.

TABLE 1

| raw materials used for composition ZA | |
|---|---|
| Raw materials | (% by wt.) |
| Liquid epoxy resin, D.E.R. 331 (bisphenol A diglycidyl ether), Dow | 50 |

TABLE 1-continued raw materials used for composition ZA

| Raw materials | (% by wt.) |
|---|---|
| Reactive diluent, hexanediol glycidyl ether, Denacol EX-212, Nagase America | 1 |
| Toughness improver D-1 | 20 |
| Curing agent, dicyandiamide (= "Dicy") | 4 |
| Accelerator, substituted urea | 0.2 |
| Filler mixture, mixture of calcium carbonate and calcium oxide | 24.8 |
| Total (% by wt.) | 100 |

Preparation of a Toughness Improver ("D-1")

150 g of poly-THF 2000 (OH number 57 mg/g KOH) and 150 g of PolyBD R45V (OH number 46 mg/g KOH) were dried under reduced pressure at 105° C. for 30 minutes. Once the temperature had been reduced to 90° C., 61.5 g of IPDI and 0.14 g of dibutyltin dilaurate were added. The reaction was carried out under reduced pressure at 90° C. until the NCO content was constant at 3.10% after 2.0 h (calculated NCO content: 3.15%). Subsequently, 96.1 g of cardanol were added as blocking agent. Stirring was continued at 105° C. under vacuum until it was no longer possible to detect any free NCO. The product was used as such as toughness improver D-1.

3: significant deformation, but without material washed off
4: very significant deformation with material washed off
5: loss of material, but the originally wetted area still covered with material
6: almost complete loss of material apart from small residues Those samples that had a value from 0 to 3 were designated as washout-resistant.

Viscosity

Viscosity was measured by oscillography by means of a rheometer having a heatable plate (MCR 301, AntonPaar) at the stated temperature (1000 μm gap, measurement plate diameter: 25 mm (plate/plate), deformation 0.01 at 5 Hz, heating rate: 10° C./min).

Impact Peel Strength (I-Peel) (to ISO 11343)

The specimens were produced with the adhesive and DC04+ZE steel with dimensions of 90×20×0.8 mm. The bonding area here was 20×30 mm at a layer thickness of 0.2 mm with glass beads as spacer. The samples were cured for 25 minutes at oven temperature 180° C.

Impact peel strength was measured in each case at the temperatures specified (23° C., −30° C.) as a triple determination on a Zwick 450 impact pendulum. The impact peel strength reported is the average force in N/mm under the measurement curve from 25% to 90% to ISO11343.

Results

It is apparent from table 2 that adequate washout resistance is not achieved when less than 2% by weight of

TABLE 2

Poly-THF 2000 (difunctional polybutylene glycol)
(OH equivalent weight = about 1000 g/OH equivalent), BASF
PolyBD R45V (hydroxyl-terminated polybutadiene)
(OH equivalent weight = about 1230 g/OH equivalent), Cray Valley
Isophorone diisocyanate (="IPDI"), Evonik
Cardolite NC-700 (cardanol, meta-substituted alkenylmonophenol), Cardolite

|  | Ref1 | Ref2 | Ref3 | Ref4 | Ref5 | Ex1 | Ex2 | Ref6 |
|---|---|---|---|---|---|---|---|---|
| Composition ZA (% by wt.) | 100 | 98 | 96 | 93.5 | 98.4 | 96.7 | 93.5 | 92 |
| Aerogel particles (% by wt.) | — | — | — | — | 1.6 | 3.3 | 6.5 | 8 |
| Fumed silica (% by wt.) | — | 1.6 | 3.3 | 6.5 | — | — | — | — |
| Total (% by wt.) | 100 | 100 | 100 | 100 | 100 | 100 | 100 | 100 |
| IP (23° C.) (MPa) | <15 | n.d. | n.d. | n.d. | 18.6 | 22.3 | n.d. | n.d. |
| IP (−30° C.) (MPa) | <8 | n.d. | n.d. | n.d. | 11.2 | 13.2 | 8.0 | n.d. |
| Washout | 6 | 6 | 4 | 1 | 6 | 1 | 0 | 0 |
| Viscosity (Pas) | <500 | n.d. | n.d. | n.d. | n.d. | 1000-2000 | 3000-4000 | 6500 |

"n.d." = not determined, fumed silica: Wacker, aerogel particles: Aerogel Cabot P300, Cabot Corp. (Billerica, MA, USA).

Washout Resistance

To determine washout resistance, the respective composition was applied at room temperature as a triangular bead (width 8 mm, height 10 mm) to an oiled metal sheet (200×25 mm, electrolytically galvanized). The sheet has one hole at each end of the sheet (Ø 8 mm, central, distance 10 mm from the end of the sheet) for securing to the pivot mount. Thereafter, the sample was conditioned at room temperature for one hour.

Subsequently, these metal sheets were mounted on a pivot mount and suspended in a vessel filled with water at 55° C. with half of them in the water at a stirrer speed of 60 rpm and rotated for 10 min. The distance of the metal sheets measured from the axis of the pivot mount is 120 mm.

After the test had been performed, the deformation of the bead was assessed by the following scale:
0: unchanged compared to original state
1: slight deformation
2: distinct deformation without material washed off aerogel particles is used, and the viscosity reaches too high a value when more than 7% by weight of aerogel particles is used.

It has been found that, surprisingly, very good washout resistance superior to the use of fumed silica is obtained in the range of 2-7% by weight of aerogel particles.

Moreover, it has been found that, surprisingly, compositions containing 3.3% by weight of aerogel particles have high impact peel strength values at −30° C. compared to compositions containing zero or 1.6% by weight of aerogel particles. The same behavior was also observed for impact peel strength at 23° C.

The invention claimed is:

1. A one-component thermosetting epoxy resin adhesive comprising:
   a) at least one epoxy resin having an average of more than one epoxy group per molecule, wherein the at least one epoxy resin includes a liquid epoxy resin, and a proportion of the at least one epoxy resin is in a range of from 15% to 60% by weight, based on a total weight of the one-component thermosetting epoxy resin adhesive;

b) at least one latent curing agent for epoxy resins, wherein the at least one latent curing agent includes dicyandiamide, and an amount of the at least one latent curing agent is 1-8% by weight, based on the total weight of the one-component thermosetting epoxy resin adhesive; and c) 2-5% by weight of aerogel particles, based on the total weight of the one-component thermosetting epoxy resin adhesive, d) at least one filler that is not the aerogel particles, and an amount of the at least one filler is 5-40% by weight, based on the total weight of the one-component thermosetting epoxy resin adhesive;

e) at least one toughness improver D that is a terminally blocked polyurethane polymer D1, a terminally blocked polyurethane prepolymer of the formula (I) and a proportion of the terminally blocked polyurethane prepolymer of the formula (I) is in a range of from 20% to 40% by weight, based on the total weight of the one-component thermosetting epoxy resin adhesive, wherein the formula (I) is:

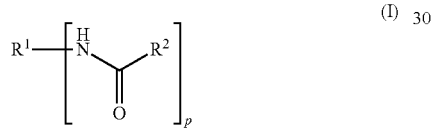

where

R$^1$ is a p-valent radical of a linear or branched polyurethane prepolymer terminated by isocyanate groups after the removal of the terminal isocyanate groups;

p has a value of 2 to 8; and

R$^2$ is independently a substituent selected from the group consisting of

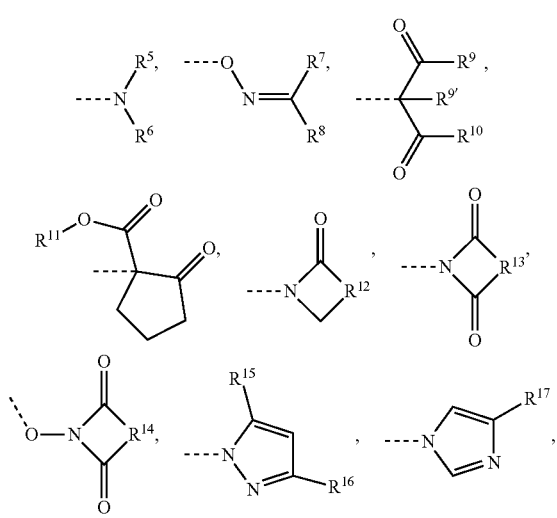

-continued

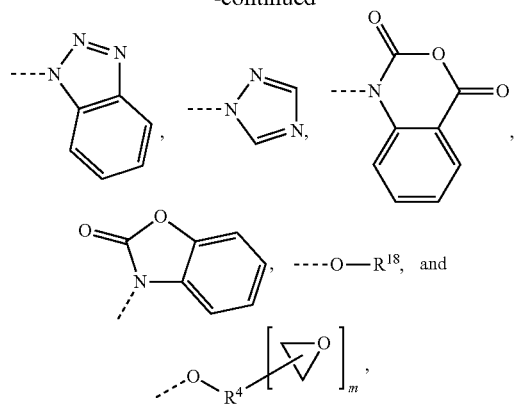

where

R$^5$, R$^6$, R$^7$ and R$^8$ are each independently an alkyl or cycloalkyl or aralkyl or arylalkyl group or R$^5$ together with R$^6$, or R$^7$ together with R$^8$, form part of a 4- to 7-membered, optionally substituted ring;

R$^9$, R$^{9'}$ and R$^{10}$ are each independently an alkyl or aralkyl or arylalkyl group or an alkyloxy or aryloxy or aralkyloxy group;

R$^{11}$ is an alkyl group,

R$^{12}$, R$^{13}$ and R$^{14}$ are each independently an alkylene group which has 2 to 5 carbon atoms and optionally has double bonds or is substituted, or a phenylene group or a hydrogenated phenylene group;

R$^{15}$, R$^{16}$ and R$^{17}$ are each independently H or an alkyl group or an aryl group or an aralkyl group; and R$^{18}$ is an aralkyl group or is a mono- or polycyclic, substituted or unsubstituted aromatic group optionally having aromatic hydroxyl groups;

R$^4$ is a radical of an aliphatic, cycloaliphatic, aromatic or araliphatic epoxide containing a primary or secondary hydroxyl group after the removal of the hydroxyl and epoxy groups; and m has a value of 1, 2 or 3; and f) optionally at least one of a reactive diluent and an accelerator;

wherein the one-component thermosetting epoxy resin adhesive has a viscosity of 1000-4000 Pas at 25° C., as determined by oscillography using a rheometer with a heatable plate, the rheometer is MCR 301 available from Anton Paar, and rheometer conditions include a 1000 μm gap, a measurement plate diameter of 25 mm, plate/plate, deformation 0.01 at 5 Hz, and a temperature of 25° C.

2. The one-component thermosetting epoxy resin adhesive as claimed in claim 1, comprising amorphous silicon dioxide aerogel particles.

3. The one-component thermosetting epoxy resin adhesive as claimed in claim 1, wherein a particle density of the aerogel particles is 90-200 kg/m$^3$.

4. The one-component thermosetting epoxy resin adhesive as claimed in claim 1, wherein the aerogel particles have an average particle size of 0.01-5 mm.

5. The one-component thermosetting epoxy resin adhesive as claimed in claim 1, wherein the one-component thermosetting epoxy resin adhesive has a viscosity between 1000 Pas and 3000 Pa·s at 25° C.

6. The one-component thermosetting epoxy resin adhesive as claimed in claim 1, wherein the at least one latent curing agent is selected from dicyandiamide, guanamines, guanidines, aminoguanidines and derivatives thereof, substituted ureas, imidazoles, and amine complexes.

7. A method of bonding substrates, comprising the steps of
 a) applying the one-component thermosetting epoxy resin adhesive as claimed in claim 1, to a first substrate;
 b) contacting the applied one-component thermosetting epoxy resin adhesive with a second substrate, to form an adhesive bond; and
 c) curing the one-component thermosetting epoxy resin adhesive in the adhesive bond at a temperature in the range from 100 to 220° C.

8. The method as claimed in claim 7, further comprising a step b') between step b) and step c), wherein step b') comprises: contacting the substrates and the one-component thermosetting epoxy resin adhesive in contact therewith with a wash liquid at a temperature between 20 and 100° C.

9. An article comprising a cured adhesive bond, wherein the adhesive bond is obtained by the method as claimed in claim 7.

10. The one-component thermosetting epoxy resin adhesive as claimed in claim 1, wherein the aerogel particles are effective to increase washout resistance of the one-component thermosetting epoxy resin adhesive.

11. The one-component thermosetting epoxy resin adhesive as claimed in claim 1, wherein the aerogel particles are effective to increase impact peel, I-peel, strength to ISO 11343, of the one-component thermosetting epoxy resin adhesive.

12. The one-component thermosetting epoxy resin adhesive as claimed in claim 1, wherein the amount of the at least one latent curing agent is 1-4% by weight, based on the total weight of the one-component thermosetting epoxy resin adhesive.

* * * * *